United States Patent
Zhang et al.

(10) Patent No.: US 7,239,870 B2
(45) Date of Patent: Jul. 3, 2007

(54) WIRELESS COMMUNICATION METHOD AND APPARATUS WITH RECONFIGURABLE ARCHITECTURE FOR SUPPORTING AN ENHANCED UPLINK SOFT HANDOVER OPERATION

(75) Inventors: Guodong Zhang, Farmingdale, NY (US); Stephen E. Terry, Northport, NY (US); Stephen G. Dick, Nesconset, NY (US)

(73) Assignee: IPR Licensing, Inc., Wilmington, DE (US)

( * ) Notice: Subject to any disclaimer, the term of this patent is extended or adjusted under 35 U.S.C. 154(b) by 275 days.

(21) Appl. No.: 10/939,272

(22) Filed: Sep. 10, 2004

(65) Prior Publication Data

US 2005/0157680 A1 Jul. 21, 2005

Related U.S. Application Data

(60) Provisional application No. 60/517,691, filed on Nov. 5, 2003.

(51) Int. Cl.
*H04Q 7/20* (2006.01)
(52) U.S. Cl. .................. 455/422.1; 455/436; 455/445; 455/450; 370/503
(58) Field of Classification Search ................ 455/436, 455/438, 439, 445, 442, 450, 422.1; 370/503
See application file for complete search history.

(56) References Cited

U.S. PATENT DOCUMENTS 6,507,567 B1 * 1/2003 Willars ........................ 370/321
2004/0116143 A1 * 6/2004 Love et al. ................... 455/522
2004/0214574 A1 * 10/2004 Eyuboglu et al. ........... 455/439

OTHER PUBLICATIONS

3GPP2 C.S0002-C, "Physical Layer Standard for cdma2000 Spread Spectrum Systems", 3rd Generation Partnership Project 2 "3GPP2", Version 2.0, Revision C, Jul. 23, 2004.
3GPP2 C.20003-C, "Medium Access Control (MAC) Standard for cdma2000 Spread Spectrum Systems", 3rd Generation Partnership Project 2 "3GPP2", Version 2.0, Release C, Aug. 2004.
3GPP2 C.S0004-C, "Signaling Link Access Control (LAC) Standard for cdma2000 Spread Spectrum Systems" , 3rd Generation Partnership Project 2 "3GPP2", Version 2.0, Revision C, Jul. 23, 2004.
3GPP2 C.S0005-C, "Upper Layer (Layer 3) Signaling Standard for cdma2000 Spread Spectrum Systems", 3rd Generation Partnership Project 2 "3GPP2", Version 2.0, Revision c, Jul. 23, 2004.

* cited by examiner

*Primary Examiner*—Joseph Feild
*Assistant Examiner*—Inder Pal Mehra
(74) *Attorney, Agent, or Firm*—Volpe & Koenig, P.C.

(57) ABSTRACT

A method and apparatus for supporting an enhanced uplink soft handover (EU-SHO) operation for a wireless transmit/receive unit (WTRU). The apparatus may be a multi-cell wireless communication system including at least two EU-SHO Node-Bs and a radio network controller (RNC). The RNC includes a medium access control (MAC) entity that handles enhanced uplink dedicated channel (EU-DCH) functionalities. The RNC is configured according to a first architecture when an EU-SHO operation for the WTRU is not taking place, and the RNC is configured according to a second architecture when the WTRU is operating in an EU-SHO operation. According to the second architecture, the MAC entity of the RNC includes an ACK/NACK generator which generates signals indicating whether or not an EU transmission originating from the WTRU has been successfully received by the RNC, and an uplink scheduler for scheduling an EU transmission for the WTRU.

8 Claims, 3 Drawing Sheets

WIRELESS COMMUNICATION METHOD AND APPARATUS WITH RECONFIGURABLE ARCHITECTURE FOR SUPPORTING AN ENHANCED UPLINK SOFT HANDOVER OPERATION

CROSS REFERENCE TO RELATED APPLICATION

This application claims priority from U.S. Provisional Patent Application Ser. No. 60/517,691, filed Nov. 5, 2003, which is incorporated by reference as if fully set forth herein.

FIELD OF INVENTION

The present invention relates to wireless communication systems. More specifically, the present invention relates to a method and apparatus for supporting an enhanced uplink soft handover (EU-SHO) operation by reconfiguring the architecture of a radio network controller (RNC) and a Node-B.

BACKGROUND

Methods for improving uplink coverage, throughput and transmission latency are currently being investigated in third generation partnership project (3GPP) in the context of the Release 6 (R6) universal mobile telecommunications system (UMTS) study item "FDD uplink enhancements".

It is widely anticipated that in order to achieve these goals, Node-B (base station) will take over the responsibility of scheduling and assigning uplink resources (physical channels) to users. The principle is that Node-B can make more efficient decisions and manage uplink radio resources on a short-term basis better than the RNC, even if the RNC retains coarse overall control. A similar approach has already been adopted in the downlink for Release 5 (R5) high speed downlink packet access (HSDPA) in both UMTS frequency division duplex (FDD) and time division duplex (TDD) modes.

It is also envisioned that there could be several independent uplink transmissions processed between a wireless transmit/receive unit (WTRU) and a universal terrestrial radio access network (UTRAN) within a common time interval. One example of this would be medium access control (MAC) layer hybrid automatic repeat request (HARQ) or simply MAC layer automatic repeat request (ARQ) operation where each individual transmission may require a different number of retransmissions to be successfully received by UTRAN. To limit the impact on system architecture, it is expected that protocol layers above the MAC should not be affected by introduction of the enhanced uplink dedicated channel (EU-DCH). One requirement that is introduced by this is the in-sequence data delivery to the radio link control (RLC) protocol layer. Therefore, similar to HSDPA operation in the downlink, a UTRAN re-ordering function is needed to organize the received data blocks according to the sequence generated by the WTRU RLC entity.

A soft handover macro-diversity operation requires centralized control of uplink transmissions in each cell within an active set. The active set may include a plurality of Node-Bs. Retransmissions are generated until successful transmission is realized by at least one of the Node-Bs. Successful transmission is not guaranteed at all of the Node-Bs. Therefore, since a complete set of successful transmissions may not be available within any one Node-B, re-ordering of successful transmissions cannot be accomplished.

SUMMARY

The present invention is related to a method and apparatus for supporting an EU-SHO operation for a WTRU. The apparatus may be a multi-cell wireless communication system, an RNC or an integrated circuit (IC) located in the RNC. The multi-cell wireless communication system includes at least two EU-SHO Node-Bs and an RNC. The RNC includes a first MAC entity that handles EU-DCH functionalities. The RNC is configured according to a first architecture when an EU-SHO operation for the WTRU is not taking place, and the RNC is configured according to a second architecture when the WTRU is operating in an EU-SHO operation. According to the second architecture, the first MAC entity of the RNC includes a first ACK/NACK generator which generates signals indicating whether or not an EU transmission originating from the WTRU has been successfully received by the RNC, and a first uplink scheduler for scheduling an EU transmission for the WTRU.

Each EU-SHO Node-B may include a second MAC entity that handles EU-DCH functionalities. The second MAC entity includes an HARQ/ARQ entity that communicates with the RNC via a respective signaling channel.

When an EU-SHO operation for the WTRU is not taking place, a second MAC entity in a Node-B, currently operating in conjunction with the WTRU, may be configured to include a second ACK/NACK generator which transmits signals to the WTRU indicating whether or not an EU transmission originating from the WTRU has been successfully received by the Node-B, and a second uplink scheduler for scheduling an EU transmission for the WTRU. The first uplink scheduler may communicate with each EU-SHO Node-B via an EU frame protocol.

When the WTRU is operating in the soft handover, the second MAC entity at the EU-SHO Node-B only includes an HARQ/ARQ entity.

BRIEF DESCRIPTION OF THE DRAWING(S)

A more detailed understanding of the invention may be had from the following description of a preferred embodiment, given by way of example, and to be understood in conjunction with the accompanying drawings wherein.

DETAILED DESCRIPTION OF THE PREFERRED EMBODIMENT(S)

Figure 1:
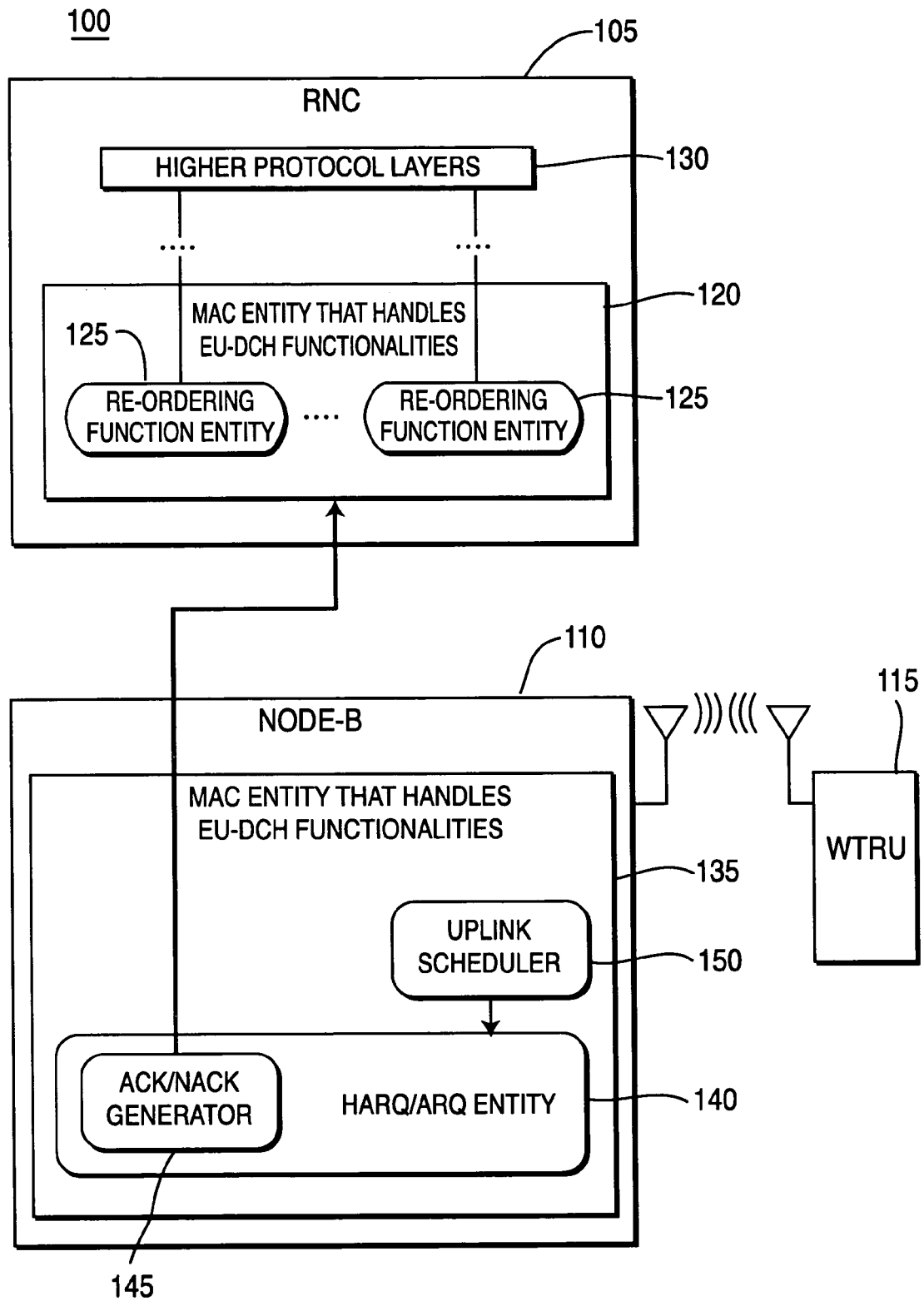
FIG. 1 shows a first system configuration during normal operation (not in soft handover) in accordance with the present invention.

The present invention will be described with reference to the drawing figures wherein like numerals represent like elements throughout.

Hereafter, the terminology "WTRU" includes but is not limited to a user equipment (UE), a mobile station, a fixed or mobile subscriber unit, a pager, or any other type of device capable of operating in a wireless environment.

When referred to hereafter, the terminology "base station" includes but is not limited to a Node-B, a site controller, an access point or any other type of interfacing device in a wireless environment.

The present invention may be further applicable to TDD, FDD, and time division synchronous code division multiple access (TD-SCDMA), as applied to UMTS, CDMA 2000 and CDMA in general, but is envisaged to be applicable to other wireless systems as well. With respect to CDMA2000, the present invention may be implemented in EV-DO (i.e., data only) and EV-DV (i.e., data and voice).

The features of the present invention may be incorporated into an IC or be configured in a circuit comprising a multitude of interconnecting components.

The present invention, in one embodiment, provides a distributed UTRAN MAC architecture solution for enhanced uplink incorporating re-ordering function, uplink scheduling function, ACK/NACK generation function and HARQ/ARQ entity. With the proper UTRAN MAC architecture, soft and hard handover will be supported efficiently, and loss of MAC data and RLC recoveries are reduced. The invention proposes details of the preferred MAC architecture to address these requirements.

Furthermore, the invention proposes a distributed UTRAN MAC architecture solution for enhanced uplink. The invention also proposes to implement the HARQ/ARQ entity at the Node-B, and implement the re-ordering function within the RNC regardless of the WTRU operation scenario.

In addition to the above, the invention proposes to implement the uplink scheduling function at the Node-B and RNC. However, for a WTRU there is only one uplink scheduling function configured for it at any time. Whether the uplink scheduling function is configured at the Node-B or RNC depends on the WTRU operation scenario (soft handover or not).

It is important to note that the invention also proposes to implement the ACK/NACK generation function at the Node-B and RNC. However, for a WTRU there is only one ACK/NACK generation function configured for it at any time. Whether the ACK/NACK generation function is configured at the Node-B or RNC depends on the WTRU operation scenario (soft handover or not).

During an EU-SHO operation, higher layers maintain an active subset of EU cells for which EU-DCHs are maintained in a soft handover macro diversity state. Those cells in the active subset are controlled by different EU-SHO Node-Bs.

In accordance with the present invention, the architecture of a multi-cell wireless communication system transitions between a first configuration and a second configuration, depending on whether or not an EU-SHO operation takes place.

FIG. 1 shows a first system configuration 100 of a wireless communication system including an RNC 105 and a Node-B 110 during normal operation, (not in soft handover). The Node-B communicates with a WTRU 115. The RNC 105 is configured to include a first MAC entity 120. The first MAC entity 120 in the RNC 105 handles EU-DCH functionalities and includes one or more re-ordering function entities 125. Each re-ordering function entity 125 communicates with higher protocol layers 130 within the RNC 105 and includes an associated data buffer (not shown). The Node-B 110 is configured to include a second MAC entity 135 that handles EU-DCH functionalities, an HARQ/ARQ entity 140 having an ACK/NACK generator 145, and an uplink scheduler 150.

The HARQ/ARQ entity 140 is configured at the Node-B 110 to handle the HARQ/ARQ functionality for one user. The re-ordering function entity 125 is configured at the RNC 105 to perform the re-ordering for correctly received data blocks, i.e. packet data units (PDUs), to support in-sequence delivery to higher protocol layers 130. The uplink scheduler 150 is configured at the Node-B 110 to schedule an EU transmission for the WTRU 115. The ACK/NACK generator 145 is configured at the Node-B 110 for informing the WTRU 115 of the success or failure of an EU transmission. As shown in FIG. 1, the ACK/NACK generator 145 is incorporated into the HARQ/ARQ entity 140 of the node-B 110 in a normal operation scenario.

The re-ordering function entity 125 is not affected by an intra-Node-B EU serving cell change, i.e., a hard handover. In other words, the re-ordering buffer (not shown) of the RNC does not need to be flushed during an intra-Node-B EU serving cell change. Since the re-ordering buffer is not flushed, no out-of-sequence delivery to the RLC and no RLC recovery (on the WTRU side) is caused by an intra-Node-B EU serving cell change. ACK/NACK and uplink scheduling information is sent to the WTRU 115 via fast layer one signaling. Therefore, the delay is very low.

Figure 2:
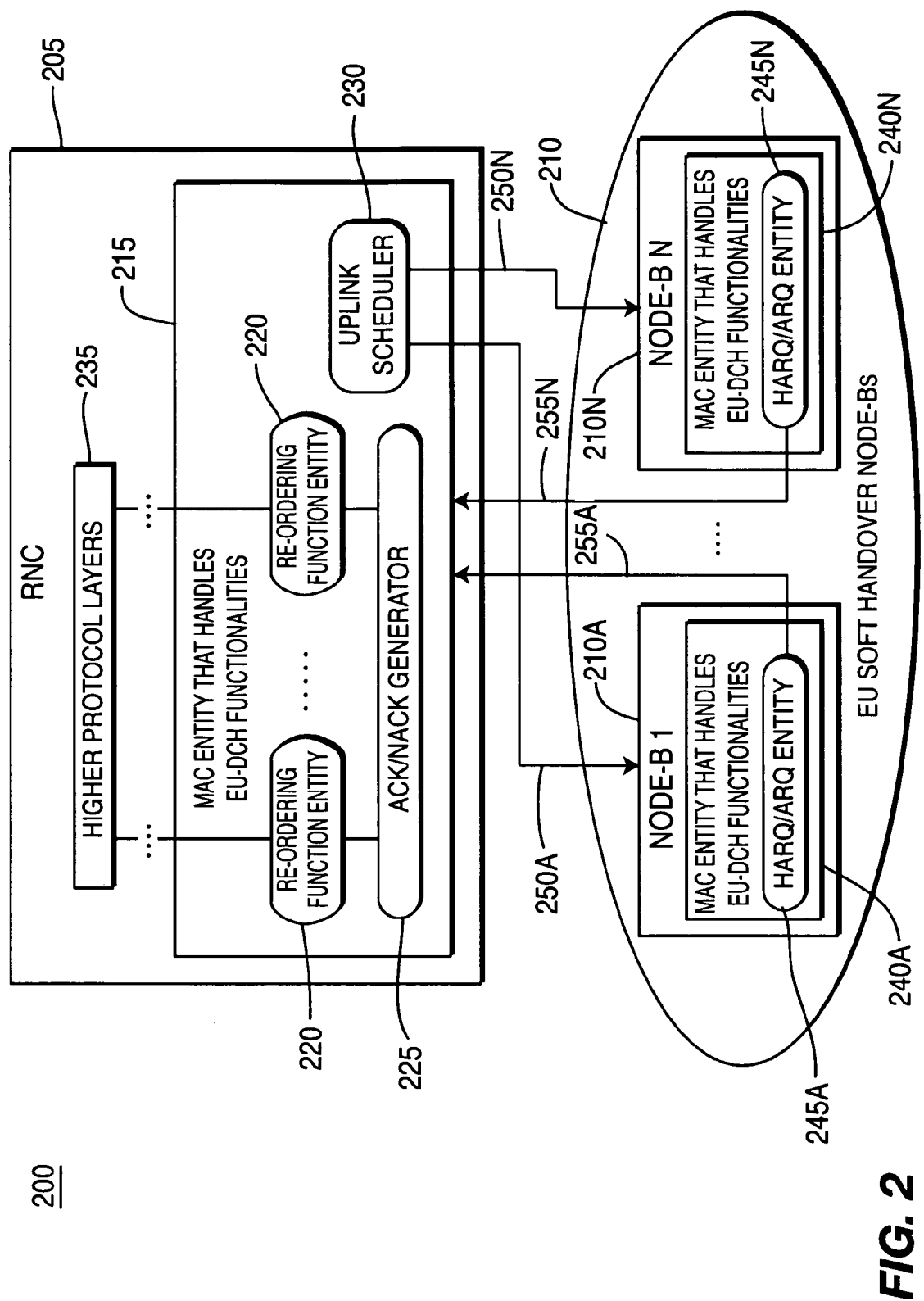
FIG. 2 shows a second system configuration when a WTRU is operating in an EU-SHO operation in accordance with the present invention.

FIG. 2 shows a second system configuration 200 of the wireless communication system shown in FIG. 1. A transition takes place from the first system configuration 100 to the second system configuration 200 when the RNC 105 detects that the WTRU 115 will transition from normal operation to an EU-SHO operation. The second system configuration 200 includes an RNC 205 and at least two (2) EU-SHO Node-Bs 210 (210A . . . 210N) operating during EU-SHO. The RNC 205 is configured to include a first MAC entity 215 located at the RNC 205. The first MAC entity 215 handles EU-DCH functionalities and includes one or more re-ordering entities 220, an ACK/NACK generator 225 and an uplink scheduler 230. Each re-ordering function entity 220 communicates with higher protocol layers 235 within the RNC 205 and includes an associated data buffer (not shown). Each of the Node-Bs 210 is configured to include a second MAC entity 240 (240A . . . 240N) that handles EU-DCH functionalities and an HARQ/ARQ entity 245 (245A . . . 245N). Each HARQ/ARQ entity 245 handles the HARQ/ARQ functionality for one user. The uplink scheduler 230 within the MAC entity 215 at the RNC 205 communicates with each of the Node Bs 210 via EU frame protocol 250A . . . 250N. The HARQ/ARQ entities 240A . . . 240N communicate with the RNC 105 via signaling channels 255A . . . 255N, respectively.

Still referring to FIG. 2, during an EU-SHO operation, if a data block received at the any EU-SHO Node-B 210 is decoded successfully, i.e., the data block passes a cyclic redundancy check (CRC), it will be forwarded to the RNC 205 via EU frame protocol 255A . . . 255N. The re-ordering function entity 220 at the RNC 205 performs a re-ordering function for correctly received data blocks to support in-sequence delivery to the higher protocol layers 235. The uplink scheduler 230 in the RNC 205 is responsible for scheduling an EU transmission for the WTRU in cells that are controlled by different ones of the EU-SHO Node-Bs 210. The ACK/NACK generator 225 in the RNC 205 generates a positive acknowledgement (ACK) for transmission to a WTRU when the RNC 205 receives at least one copy of a successfully decoded data block with a good CRC check result from an EU-SHO Node-B 210. Otherwise, it is determined that a data block was not received correctly and therefore the ACK/NACK generator 225 in the RNC 205 generates a negative acknowledgement (NACK) for transmission to the WTRU.

Data blocks received from different ones of the EU-SHO Node-Bs 210 can be combined and organized in sequence for delivery to the higher protocol layers 235. The reordering entity 220 located within the RNC 205 allows EU MAC PDUs to be processed for successful reception and proper delivery to the higher protocol layers 235 independent of which Node-B(s) provided reception of each PDU. Thus, the loss of MAC data and RLC recoveries are reduced.

By using the uplink scheduler 230 in the RNC 205 during an EU-SHO operation, an EU transmission scheduled by one EU-SHO Node-B 210 is acceptable in terms of resources and interference for the cells that are controlled by other EU-SHO Node-Bs 210.

Figure 3:
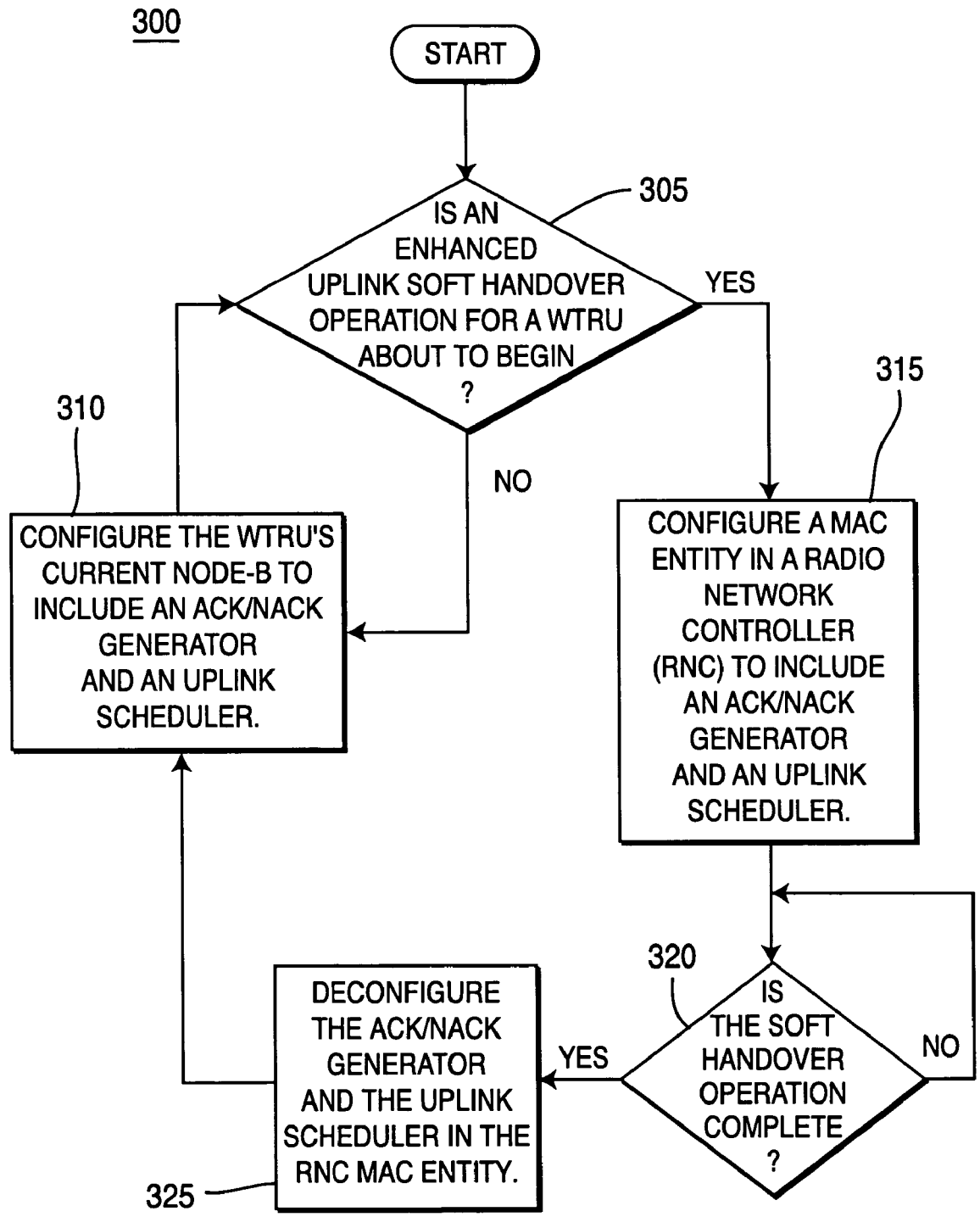
FIG. 3 is a flowchart of a process including method steps for implementing the system configurations of FIGS. 1 and 2.

FIG. 3 is a flowchart of a process 300 including method steps for implementing the system configurations 100 and 200 shown in FIGS. 1 and 2, respectively. During normal operation, the RNC 105 continually monitors for any indication that an EU soft handover operation is about to begin (step 305). As shown in the system configuration 100 of FIG. 1, during normal operation, i.e., before or after an EU-SHO operation occurs, a current Node-B 110 of the WTRU 115 is configured such that the current Node-B 110 includes an ACK/NACK generator 145 and an uplink scheduler 150 (step 310). If the RNC 105 detects that an EU-SHO operation is about to begin in step 305, the architecture of the MAC entity 120 in the RNC 105 of FIG. 1 is reconfigured according to the architecture of the MAC entity 215 in the RNC 205 of FIG. 2, whereby the MAC entity 215 includes the ACK/NACK generator 225 and the uplink scheduler 230 (step 315). After a soft handover operation has been completed, as determined in step 320, the ACK/NACK generator 225 and the uplink scheduler 230 in the MAC entity 215 of RNC 105 are deconfigured (step 325) and a new Node-B 110 associated with the WTRU 115 during the EU-SHO operation is configured to include an ACK/NACK generator 145 and an uplink scheduler 150 (step 310), as shown in FIG. 1.

While this invention has been particularly shown and described with reference to preferred embodiments, it will be understood by those skilled in the art that various changes in form and details may be made therein without departing from the scope of the invention described hereinabove.

What is claimed is:

1. In a multi-cell wireless communication system including at least one radio network controller (RNC) which includes a first medium access control (MAC) entity that handles enhanced uplink dedicated channel (EU-DCH) functionalities, a method for supporting an enhanced uplink soft handover (EU-SHO) operation associated with a wireless transmit/receive unit (WTRU) and at least two EU-SHO Node-Bs which communicate with the RNC, the method comprising:
   (a) detecting that an EU-SHO operation is about to begin; and
   (b) in response to step (a), transitioning the multi-cell wireless communication system from a first system configuration that includes 1) an RNC that does not have an uplink scheduler, and 2) at least one Node-B that has an uplink scheduler, to a second system configuration that includes an RNC having a first MAC entity which includes:
      (i) a first generator which generates signals indicating whether or not an EU transmission originating from the WTRU has been successfully received by the RNC; and
      (ii) a first uplink scheduler for scheduling an EU transmission for the WTRU.

2. The method of claim 1 wherein each EU-SHO Node-B includes a second MAC entity that handles EU-DCH functionalities, the second MAC entity including a hybrid automatic repeat request/automatic repeat request (HARQ/ARQ) entity that communicates with the RNC via a respective signaling channel.

3. The method of claim 1 further comprising:
   (c) when a soft handover operation for the WTRU is not taking place, configuring a second MAC entity in a Node-B, currently operating in conjunction with the WTRU, to include:
      (i) a second generator which transmits signals to the WTRU indicating whether or not an EU transmission originating from the WTRU has been successfully received by the Node-B; and
      (ii) a second uplink scheduler for scheduling an EU transmission for the WTRU.

4. The method of claim 1 wherein the first uplink scheduler communicates with each EU-SHO Node-B via an EU frame protocol.

5. A multi-cell wireless communication system for supporting an enhanced uplink soft handover (EU-SHO) operation for a wireless transmit/receive unit (WTRU), the system comprising:
   (a) at least two enhanced uplink soft handover (EU-SHO) Node-Bs; and
   (b) at least one radio network controller (RNC) which includes a first medium access control (MAC) entity that handles enhanced uplink dedicated channel (EU-DCH) functionalities, wherein when it is detected that an EU-SHO operation for the WTRU is about to begin, the multi-cell wireless communication system transitions from a first system configuration that includes 1) an RNC that does not have an uplink scheduler, and 2) at least one Node-B that has an uplink scheduler, to a second system configuration that includes an RNC having a first MAC entity which includes:
      (i) a first generator which generates signals indicating whether or not an EU transmission originating from the WTRU has been successfully received by the RNC; and
      (ii) a first uplink scheduler for scheduling an EU transmission for the WTRU.

6. The system of claim 5 wherein each EU-SHO Node-B includes a second MAC entity that handles EU-DCH functionalities, the second MAC entity including a hybrid automatic repeat request/automatic repeat request (HARQ/ARQ) entity that communicates with the RNC via a respective signaling channel.

7. The system of claim 5 wherein when a soft handover operation for the WTRU is not taking place, a second MAC entity in a Node-B, currently operating in conjunction with the WTRU, is configured to include:
   (i) a second generator which transmits signals to the WTRU indicating whether or not an EU transmission originating from the WTRU has been successfully received by the Node-B; and
   (ii) a second uplink scheduler for scheduling an EU transmission for the WTRU.

8. The system of claim 5 wherein the first uplink scheduler communicates with each EU-SHO Node-B via an EU frame protocol.

* * * * *